(12) United States Patent
Igarashi et al.

(10) Patent No.: US 7,779,778 B2
(45) Date of Patent: Aug. 24, 2010

(54) COATING APPARATUS FOR OPTICAL LENS

(75) Inventors: Takashi Igarashi, Tokyo (JP); Masahiro Jinbo, Tokyo (JP); Masahiko Samukawa, Tokyo (JP); Shuichi Sato, Tokyo (JP); Norihisa Tanaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 979 days.

(21) Appl. No.: 10/591,745

(22) PCT Filed: Feb. 25, 2005

(86) PCT No.: PCT/JP2005/003139

§ 371 (c)(1),
(2), (4) Date: Aug. 30, 2006

(87) PCT Pub. No.: WO2005/084824

PCT Pub. Date: Sep. 15, 2005

(65) Prior Publication Data

US 2008/0156262 A1 Jul. 3, 2008

(30) Foreign Application Priority Data

Mar. 4, 2004 (JP) .............................. 2004-061136

(51) Int. Cl.
*B05C 5/00* (2006.01)
*B05C 11/02* (2006.01)
*B05C 11/00* (2006.01)
*B05C 13/02* (2006.01)
*B05B 7/06* (2006.01)

(52) U.S. Cl. ...................... 118/319; 118/52; 118/612; 118/642; 118/320; 118/326; 118/500; 118/62; 118/313

(58) Field of Classification Search ................ 118/52, 118/612, 56, 319, 320, 620, 641–643, 64, 118/326; 425/162, 174.4, 808, 445, 169; 427/164, 168, 240; 264/1.1, 1.36, 138; 522/181; 422/300; 203/438, 5.1
See application file for complete search history.

(56) References Cited

U.S. PATENT DOCUMENTS

| 5,820,673 | A  | * | 10/1998 | Sentilles et al. | ............. | 118/319 |
| 6,296,707 | B1 | * | 10/2001 | Adamczyk et al. | .......... | 118/668 |
| 6,416,307 | B1 | * | 7/2002 | Buazza et al. | ............... | 425/143 |
| 2007/0065633 | A1 | * | 3/2007 | Mori et al. | ................. | 428/137 |

FOREIGN PATENT DOCUMENTS

JP    52-017814 A    2/1977

(Continued)

OTHER PUBLICATIONS

"Spectacles", May 22, 1986, pp. 81-83, published by Kabushiki Kaisha Medical Aoi Shuppan Abstract.

*Primary Examiner*—Yewebdar T Tadesse
(74) *Attorney, Agent, or Firm*—Blakely, Sokoloff, Taylor & Zafman LLP

(57) ABSTRACT

A coating device (42) for a coating solution and a light beam radiating device (151) which cures the coating solution are arranged in a clean room (7). Spectacle lenses (2) include a set of two lenses and are stored in a coating container (50). The coating device (42) applies the coating solution to coating target surfaces of the spectacle lenses (2) in the coating container (50). When the set of two spectacle lenses (2) coated with the coating solution are extracted from the coating container (50), they are stored in a lens rack (120) and sealed by a transparent plate of the light beam radiating device (151). After air in the lens rack (120) is purged with nitrogen gas, curing treatment for the coating solution is performed by the light beam radiating device (151).

7 Claims, 8 Drawing Sheets

FOREIGN PATENT DOCUMENTS

| | | |
|---|---|---|
| JP | 06-201902 A | 7/1994 |
| JP | 2000-508981 A | 7/2000 |
| JP | 2000-303167 A | 10/2000 |
| JP | 2000-334369 A | 12/2000 |
| JP | 2001-059950 A | 3/2001 |
| JP | 2002-177852 A | 6/2002 |
| JP | 2003-045788 A | 2/2003 |
| JP | 2004-050108 A | 2/2004 |

* cited by examiner ced application number PCT/JP2005/003139 filed Feb. 25, 2005.

COATING APPARATUS FOR OPTICAL LENS

This is a non-provisional application claiming the benefit of International application number PCT/JP2005/003139 filed Feb. 25, 2005.

TECHNICAL FIELD

The present invention relates to a coating apparatus for an optical lens, which automatically performs a series of operations since applying a coating solution to a lens surface until curing the coating solution to form a coating film, and a lens rack employed when the coating solution applied to the optical lens is to be cured by light beam irradiation.

BACKGROUND ART

In the fabrication of an optical lens, particularly a spectacle lens, in order to improve the light-shielding properties, anti-glaring properties, photochromic properties, anti-scratch properties, and the like, a coating film is formed on the surface of the spectacle lens using a material that matches the purpose of the spectacle lens. Formation of the coating film is described in "Spectacles", May 22, 1986, pp. 81-83, published by Kabushiki Kaisha Medical Aoi Shuppan. An apparatus that forms a coating film automatically is disclosed in Japanese Patent Laid-Open No. 2002-177852, Japanese Patent Laid-Open No. 2000-508981, and the like.

A lens coating apparatus for a spectacle lens described in Japanese Patent Laid-Open No. 2002-177852 comprises a turntable-type holding body disposed in a clean room, two relatable lens holding tools which are arranged on the holding body and respectively provided with spectacle lenses, a plurality of dispensers arranged above the holding body, and a light beam radiating means which emits a light beam to cure a coating solution. The holding body intermittently rotates by a half revolution to alternatively move the two lens holding tools between a coating position which is under the dispensers and a curing position which is under the light beam radiating means. Upon a half-revolution rotation of the holding body, when one lens holding tool moves to the coating position and stops there while the other lens holding tool moves to the curing position and stops there, the dispensers drip the coating solution onto the surface of a spectacle lens which is placed on one lens holding tool. The light beam radiating means emits ultraviolet rays to the coating solution applied to the spectacle lens placed on the other lens holding tool to cure the coating solution. When application of the coating solution by the dispensers and curing operation of the coating solution by the light beam radiating means through the half-revolution rotation of the holding body are complete in this manner, the spectacle lens placed on the other lens holding tool is removed. After that, the holding body further rotates by a half revolution to move the spectacle lens on one lens holding tool to the curing position and move the other empty lens holding tool to the coating position. When a new spectacle lens is placed on the other lens holding tool, application of the coating solution by the dispensers and curing operation by the light beam radiating means are performed successively. That is, the coating apparatus performs application of the coating solution and the curing operation continuously and automatically by intermittent rotation of the holding body.

A method and apparatus for curing a spectacle lens described in PCT(WO) 2000-508981 includes a series of steps from the step since molding a plastic lens by casting polymerization until the step of forming a coating film on the molded plastic lens. In the lens molding step, the lens monomer in a cast is irradiated with the first ultraviolet rays to cure, thus molding a plastic lens. In the coating film forming step, a coating solution containing a photopolymerization initiator is applied to the lens. The obtained oxygen barrier is irradiated with the second ultraviolet rays to cure, thus forming a coating film.

DISCLOSURE OF INVENTION

Problem to be Solved by the Invention

In each of the conventional coating apparatuses described in Japanese Patent Laid-Open No. 2002-177852 and PCT (WO) 2000-508981, the spectacle lenses are conveyed one by one to form a coating film on them. As with spectacle lenses, in the custom tailor system which deals with lenses formed of a set of two lenses, the productivity is low. More specifically, assume that the coating treatment for spectacle lenses of each customer is to be performed continuously in accordance with the order. Since the lenses are exchanged after a half revolution of the holding body, two cases arise. That is, according to one case, a coating step and curing step for two spectacle lenses of different sets are to be performed simultaneously. According to the other case, a coating step and curing step for two spectacle lenses of one set are to be performed simultaneously. The treatment conditions such as the dripping quantity of the coating solution, the irradiation time of the ultraviolet rays, and the like must be changed each time in accordance with the lens information of the set. This complicates the control operation. A space must be ensured around the holding body to enable rotation of the holding body. Accordingly, the entire apparatus becomes bulky.

In the lens coating apparatus disclosed in Japanese Patent Laid-Open No. 2002-177852, the light beam emitted from the light beam radiating means in the clean room merely irradiates the coating solution applied to the surface of the spectacle lens. If fine dust, particles, or the like suspended in air in the clean room attaches to the coating solution on the lens surface, the product becomes defective.

The conventional coating apparatus described in PCT (WO) 2000-508981 employs a drawer scheme with which a drawer stores the spectacle lens with a surface being coated with the coating solution, ultraviolet rays irradiate the surface to cure the coating solution, and the spectacle lens is then extracted from the drawer. It is cumbersome to store and extract the spectacle lens in and from the drawer, leading to a coating solution curing step that requires a long period of time.

The present invention has been made to solve the conventional problems described above, and has as its object to provide a coating apparatus for an optical lens, which coats optical lenses formed of a set of two lenses automatically and simultaneously to improve the productivity.

It is another object of the present invention to provide a coating apparatus for an optical lens, in which the coating solution can be cured in a good environment so it is prevented from reacting with oxygen in air to cure.

It is still another object of the present invention to provide a lens rack with which an optical lens need not be loaded in and unloaded from a light beam radiating device and can be handled easily so the coating solution can be cured within a short period of time.

Means of Solution to the Problem

In order to achieve the above objects, the first invention is characterized by comprising a coating device which applies a coating solution to a coating target surface of an optical lens, a light beam radiating device which emits a light beam to the coating solution applied to the optical lens to cure the coating solution, and a lens rack which stores a set of two lenses and conveys the stored optical lenses from a coating position to a curing position of the coating solution, the coating device comprising two rotary tables where the set of two optical lenses are set with coating target surfaces thereof facing up, a driving device which rotates the rotary tables independently of each other, and two coating solution dripping means for dripping the coating solution onto the coating target surfaces of the optical lenses set on the rotary tables, wherein the light beam radiating device emits the light beam to the optical lenses in the lens rack with the lens rack being hermetically closed.

According to the second invention, there is provided a lens rack employed when a coating solution applied to an optical lens is to be cured by irradiation with a light beam, characterized by comprising a stationary case and a movable case each having an upwardly open storing portion which stores the optical lens coated with the coating solution, and biasing means for biasing the movable case toward the stationary case, each of the stationary case and the movable case comprising a lens placing portion which is arranged in the storing portion and on which the optical lens is to be placed with a coating target surface thereof facing up, an exhaust channel through which air in the storing portion is exhausted, and an inert gas supply channel through which an inert gas is supplied into the storing portion, wherein air in the storing portion is purged with the inert gas when the coating solution is to be cured.

EFFECT OF THE INVENTION

The coating apparatus according to the first invention can coat the optical lenses formed of a set of two lenses simultaneously. When compared to a case wherein the optical lenses are sequentially coated one by one, the lenses can be treated quickly, so that the productivity can improve. The first invention is suitable to coating spectacle lenses formed of a set of two custom-made lenses. More specifically, with the conventional treatment scheme of sequentially coating the spectacle lenses one by one, as in the coating apparatus described in Japanese patent Laid-Open 2002-177852, when custom-made spectacle lenses are to be treated, the coating and curing treatment of the coating solution for two lenses of one wearer and the coating and curing treatment of the coating solution for two lenses of two different wearers are to be performed alternately. The treatment conditions must be switched according to the lens information each time spectacle lenses are to be treated, making control complicated. In contrast to this, according to the present invention, the coating and curing treatment are performed always for spectacle lenses formed of a set of two lenses of the same type. Thus, control for coating and curing can be simplified.

With the lens rack according to the second invention, when the coating solution applied to the spectacle lens is to be cured by light beam irradiation, the opening of the lens rack is tightly closed by the light beam radiating device. Thus, dust or the like can be prevented from entering the rack, so it will not attach to the coating solution applied to the optical lens.

Since the optical lens need not be guided into the light beam radiating device, handling of the optical lens and the curing operation can be performed readily and quickly.

According to the present invention, when the coating solution is to be cured, air in the lens rack is purged with an inert gas. Thus, the coating solution can be prevented from curing due to reaction with oxygen. Since only the lens storing space in the lens rack is purged with the inert gas, the use quantity of inert gas can be decreased.

The lens rack stores optical lenses formed of a set of two lenses and conveys them from the coating position to the curing position. This enables quick convey of the optical lenses and the quick curing treatment of the coating solution. Also, no extra space need be ensured beside the lens rack, so the apparatus can be compact.

BEST MODE FOR CARRYING OUT THE INVENTION

The present invention will be described in detail exemplifying the embodiment shown in the accompanying drawings.

Figure 1:
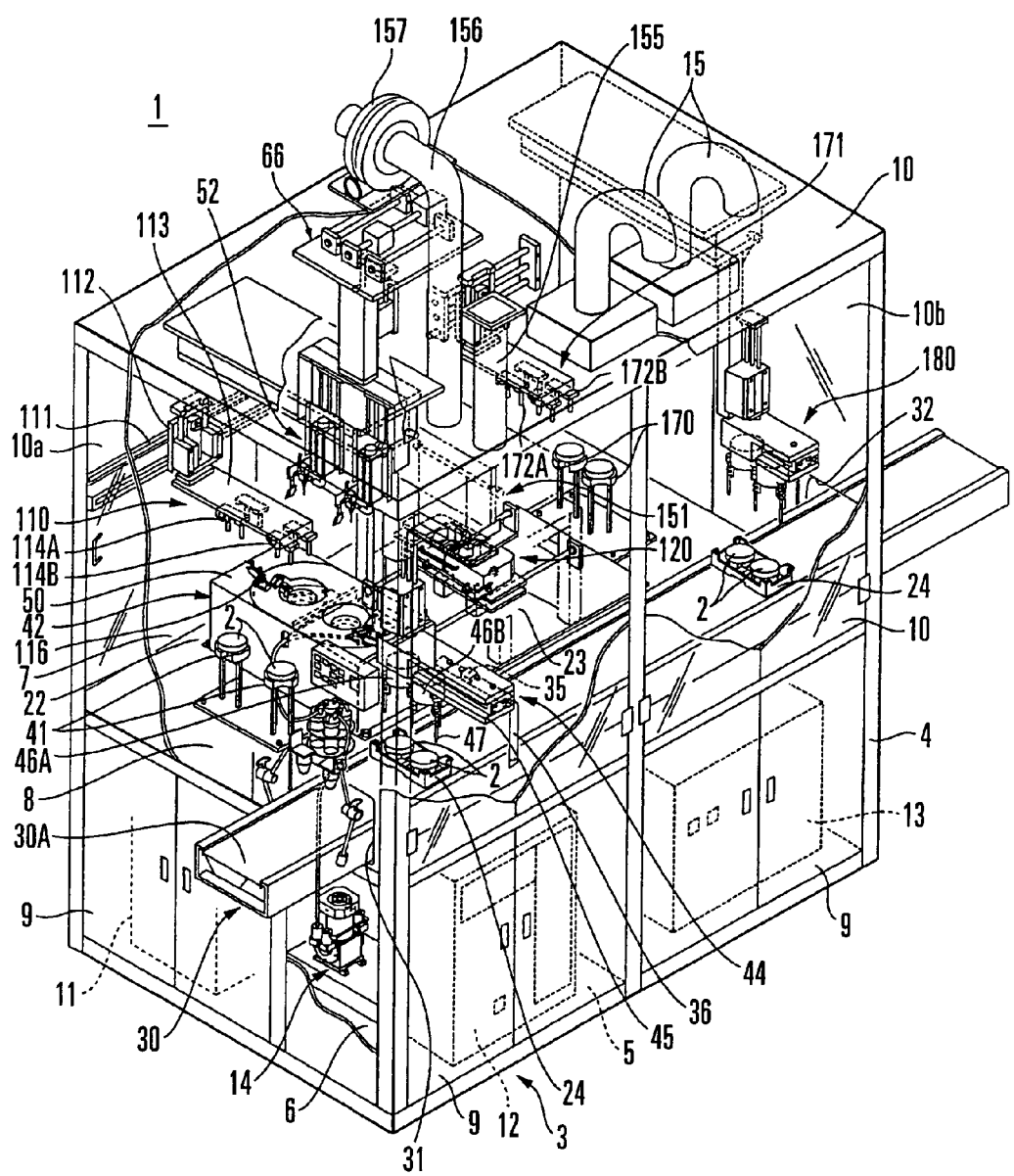
FIG. 1 is a partially cutaway appearance perspective view showing a coating apparatus for an optical lens according to an embodiment of the present invention.
Figure 2:
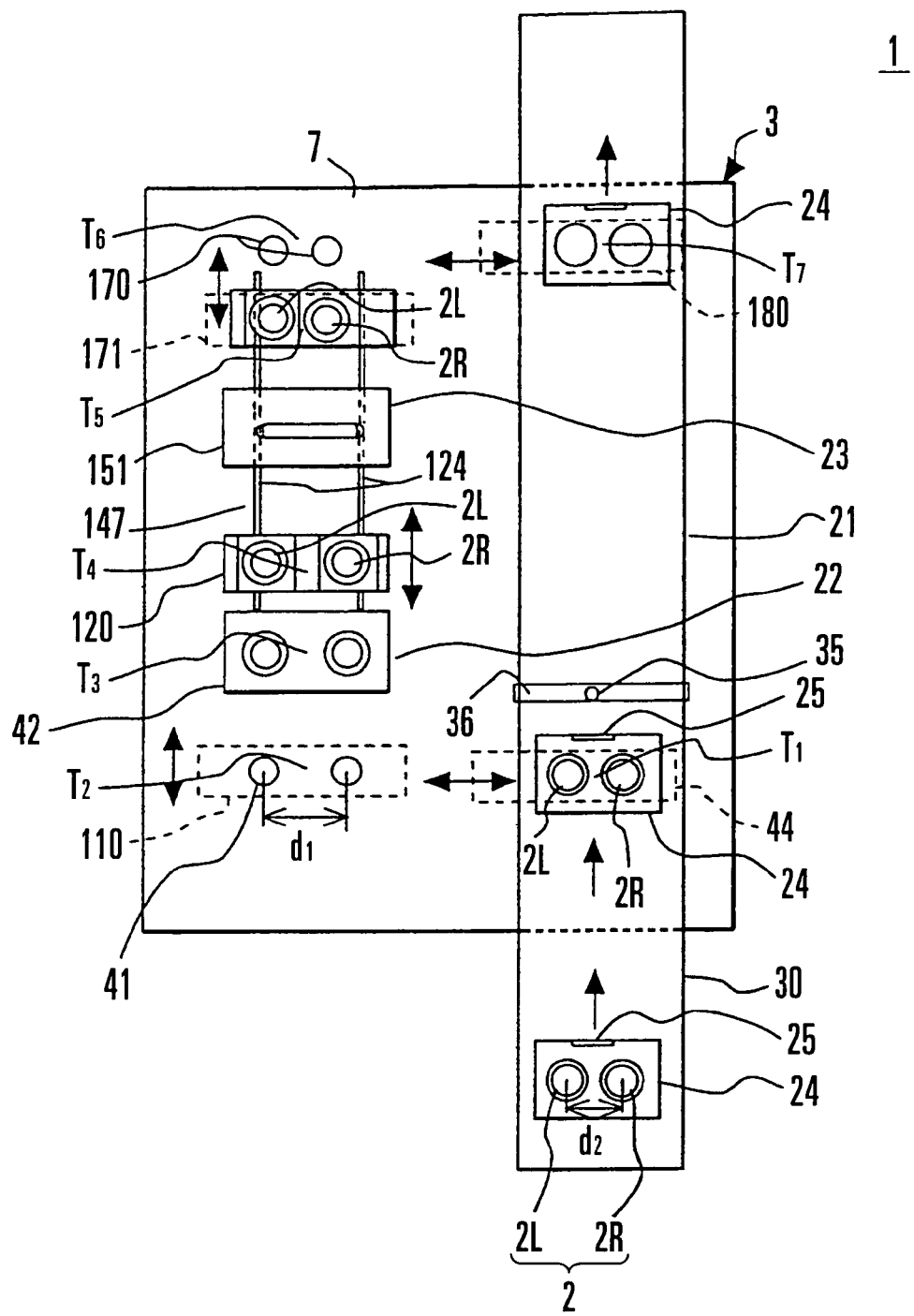
FIG. 2 is a schematic plan view showing the positional relationship among the various types of devices, means, and the like in the clean room of the coating apparatus shown in FIG. 1.

Referring to FIGS. 1 and 2, a coating apparatus denoted by reference numeral 1 comprises a cubic box 3 which is set on the floor surface and long in the back-and-forth direction. The coating apparatus 1 automatically performs a series of operations of applying a coating solution on the lens surface and curing the coating solution by irradiating it with a light beam to form a coating film. The coating apparatus 1 can perform operation of applying the coating solution to spectacle lenses 2 formed of a set of two lenses and operation of curing the coating solution successively. As the coating solution to be applied to the spectacle lens 2, an ultraviolet-curing photochromic coating solution is employed.

The spectacle lens 2 is a round plastic lens having a convex surface serving as a coating target surface 2a which is polished to form an optical surface with a predetermined radius of curvature and a concave surface which is untreated or optically polished. The spectacle lens 2 is available in different diameters of, e.g., 65 mm, 70 mm, 75 mm, 80 mm, and the like. When spectacle lenses 2 formed of a set of two, left- and right-eye lenses are to be discriminated, the left-eye lens will be denoted with a suffix (L) while the right-lens will be denoted with a suffix (R).

The box 3 of the coating apparatus 1 comprises a box-like frame structure 4 formed by connecting a plurality of frames, a bottom plate 5 of the frame structure 4, a base 8 which partitions the interior of the frame structure 4 into two, upper and lower chambers 6 and 7, nontransparent double-leafed hinged doors 9 which form the respective wall surfaces of the lower chamber 6, plates 10 which form the respective wall surfaces and the ceiling surface of the upper chamber 7, and the like.

A control box 11, a nitrogen gas supply device 12, an ultraviolet controller 13, members that constitute part of a coating solution collecting device 14, and the like are accommodated in the lower chamber 6. The control box 11 serves to control the sequence of the first to sixth convey means (to be described later), a coating device 42, a light beam radiating device 151, and the like, and is connected to an external input device (not shown). As the external input device, for example, a personal computer is used. The personal computer sets the operation timings, operation durations, and the like of the first to sixth convey means, the coating device 42, the light beam radiating device 151, and the like in accordance with the respective spectacle lenses 2. Signals from the personal computer are input to the control box 11.

The first to sixth convey mechanisms, the coating device 42, the light beam radiating device 151, and the like are accommodated in the upper chamber 7. Clean air is supplied into the upper chamber 7 from above downward through supply pipes 15. Thus, the upper chamber 7 forms a clean room with an internal pressure slightly higher than the atmospheric pressure. Hence, the upper chamber 7 will be referred to as the clean room 7 in the following description. Transparent plastic plates are used to form, of the plates 10 that form the wall surfaces and ceiling surface of the clean room 7, those that form the wall surfaces. A plastic plate 10a that forms the front surface of the wall surfaces of the clean room 7 forms an openable/closeable door. A stainless sheet is used to form the plate 10 that forms the ceiling surface.

The interior of the clean room 7 roughly comprises three regions, i.e., a tray convey portion 21, coating portion 22, and curing portion 23. The tray convey portion 21 is a portion through which a tray 24 which stores a set of two spectacle lenses 2L and 2R is conveyed backward from the front of the apparatus, and forms a region that covers the entire length in the back-and-forth direction of the right side portion in the clean room 7. The coating portion 22 is a portion which applies the coating solution to the coating target surface 2a of the spectacle lens 2, and forms a region that covers the left side of the tray convey portion 21 on the front half of the clean room 7. The curing portion 23 is a portion which cures the coating solution applied to the coating target surface 2a of the spectacle lens 2, and forms a region that covers a portion behind the coating portion 22.

The tray 24 is formed by plastic injection molding into a box and has two placing portions on its upper surface. The spectacle lenses 2L and 2R are to be placed on the two placing portions of the tray 24 with their coating target surfaces 2a facing up. A barcode 25 indicting the identification number of the tray 24 is adhered to the rear wall of the tray 24.

The tray convey portion 21 is provided with a first convey means 30 which conveys the tray 24 backward from the front. As the first convey means 30, a belt conveyor 30A which is intermittently driven by a motor is employed. When the tray 24 is placed on the front end of the belt conveyor 30A, the belt conveyor 30A travels to convey it to a first transfer position $T_1$ in the clean room 7 and stops temporarily. When the spectacle lenses 2 in the tray are extracted, the belt conveyor 30A travels again to convey the empty tray 24 from the first transfer position $T_1$ to a seventh transfer position $T_7$. The front end of the belt conveyor 30A projects forward through an opening 31 formed in the front-side plastic plate 10a of the clean room 7. Similarly, the rear end of the belt conveyor 30A projects backward through an opening 32 formed in a rear-side plastic plate 10b of the clean room 7.

The first transfer position $T_1$ is a front portion on the right side in the clean room 7, that is, a portion which is close to the opening 31 of the front-side plastic plate 10a. A tray stopper (not shown) which locks the tray 24 on the belt conveyor 30A and a barcode reader 35 which optically reads the barcode 25 are disposed near the first transfer position $T_1$.

The barcode reader 35 is attached to the center of a gate-like attaching plate 36 which bridges the two, left and right side plates of the first convey means 30. When the barcode reader 35 reads the barcode 25 adhered to the tray 24, the signal of the barcode 25 is input to a host computer (not shown). Upon reception of the barcode signal, the host computer outputs lens information necessary for coating, e.g., the lens dioptric power, diameter, and central thickness, of the respective spectacle lenses 2L and 2R to the external input device. The operator mounts the spectacle lenses 2 on the tray 24, places the tray 24 on the belt conveyor 30A, and adheres the barcode 25 to the tray 24.

The coating device 42 and two lens stages 41 which are to support the set of two spectacle lenses 2L and 2R are arranged on the coating portion 22. The two lens stages 41 are arranged at a second transfer position $T_2$. The second transfer position $T_2$ is on the left of the first transfer position $T_1$ and in front of the coating device 42. A distance $d_1$ between the two lens stages 41 is set larger than a distance $d_2$ between the two spectacle lenses 2L and 2R stored in the tray 24.

Upon reception of the lens information signal from the host computer, the external input device outputs a signal to the controller 11. The controller 11 outputs a driving signal on the basis of the signal from the external input device to operate a second convey means 44. The second convey means 44 extracts the spectacle lenses 2L and 2R from the tray 24, convey them to the second transfer position $T_2$, and place them on the respective lens stages 41.

The second convey means 44 has a pair of left and right clamp means 46A and 46B to clamp, each with three clamp pins 47, the respective spectacle lenses 2L and 2R. The clamp means 46A and 46B are arranged on a rail 45, extending in the left-to-right direction above the front end of the clean room 7, to be able to approach and separate from each other. When driven by a motor, the clamp means 46A and 46B reciprocate between the first and second transfer positions $T_1$ and $T_2$. The three clamp pins 47 which clamp the spectacle lens 2 are disposed substantially equidistantly on one circumference and driven by the motor to open/close synchronously.

The pair of clamp means 46A and 46B are arranged on the rail 45 to be vertically movable, and usually stand by above the first transfer position $T_1$. In this standby state, the pair of clamp means 46A and 46B are held at the same distance with the distance $d_2$ between the spectacle lenses 2L and 2R in the tray 24. When the tray 24 is conveyed to the first transfer position $T_1$ and stops, the pair of clamp means 46A and 46B move downward to clamp, each with the three clamp pins 47, the respective spectacle lenses 2L and 2R stored in the tray 24. The clamp means 46A and 46B then move upward again to convey the spectacle lenses 2L and 2R to above the second transfer position $T_2$. The clamp means 46A and 46B then move downward and open the clamp pins 47 to transfer the respective spectacle lenses 2L and 2R onto the respective lens stages 41. At this time, the distance between the pair of clamp means 46A and 46B increase to be equal to the distance $d_1$ between the two lens stages 41. When the spectacle lenses 2 are transferred to the lens stages 41, the pair of clamp means 46A and 46B move upward again and are restored to above the first transfer position $T_1$ as the original standby position.

When the pair of clamp means 46A and 46B extract the spectacle lenses 2 from the tray 24 and convey them from the first transfer position $T_1$ to the second transfer position $T_2$, the tray 24 becomes empty. When the tray 24 becomes empty, the first convey means 30 is driven again to convey the empty tray 24 to the seventh transfer position $T_7$ to be described later.

Referring to FIGS. 3 to 6, the coating device 42 comprises a coating container 50, a pair of left and right coating solution dripping means 52, a pair of spatula mechanisms 53, a pair of lens outer surface solution smoothening mechanisms 54, a coating solution collection device 14, and the like.

The coating container 50 is formed of a cubic container which is long in the left-to-right direction, opens upward, and set behind the first stages 41. A pair of left and right openings 58 through which the respective spectacle lenses 2L and 2R are to be inserted are formed in the upper surface of the coating container 50. A pair of left and right rotary tables 51 where the respective spectacle lenses 2L and 2R are to be set, and two stepping motors 56 which rotate the respective rotary tables 51 independently of each other are arranged in the coating container 50. When the spectacle lenses 2L and 2R are placed on the respective rotary tables 51 with their coating target surfaces 2a facing up, the coating solution dripping means 52 drips a coating solution 69 onto the coating target surfaces 2a.

When the rotary tables 51 chuck the spectacle lenses 2 placed on them by vacuum, the rotary tables 51 are rotated by the stepping motors 56 to spread thin the coating solution 63 dripped onto the coating target surfaces 2a of the spectacle lenses 2 with centrifugal force to uniform the film thickness. The rotational speed of the rotary tables 51 can be switched between two levels from a low speed to a high speed. The low rotational speed is about 15 rpm, and the high rotational speed is about 54 rpm. The distance between the pair of left and right rotary tables 51 is equal to the distance $d_1$ between the first stages 41. The distance between the pair of left and right rotary tables 51 is set larger than the distance $d_2$ between the two spectacle lenses 2 in the tray 24 so the coating solution 63 which scatters from each of the spectacle lenses 2L and 2R by the centrifugal force will not attach to the adjacent other spectacle lens. On the lower surface of the upper plate of the coating container 50, frustum-conical baffles 59 are attached around the respective openings 58 through which the respective spectacle lenses 2L and 2R are to be inserted. Each baffle 59 prevents the coating solution 63 scattering from the corresponding spectacle lens 2 with the centrifugal force from attaching to the other spectacle lens 2.

Each of the pair of left and right coating solution dripping means 52 comprises a nozzle 60, an exchangeable container 61 which stores the coating solution 63, a driving device 66 which moves the nozzle 60 together with the container 61 in the vertical direction and the back-and-forth direction when the coating solution 63 is dripped, and the like. The coating solution dripping means 52 are disposed above the coating container 50 to respectively correspond to the rotary tables 51. When a predetermined pressure is applied to the coating solution 63 in the container 61, a predetermined amount of coating solution 63 is pushed out through the nozzle 60 and dripped onto the coating target surface 2a of the spectacle lens 2.

Figure 3:
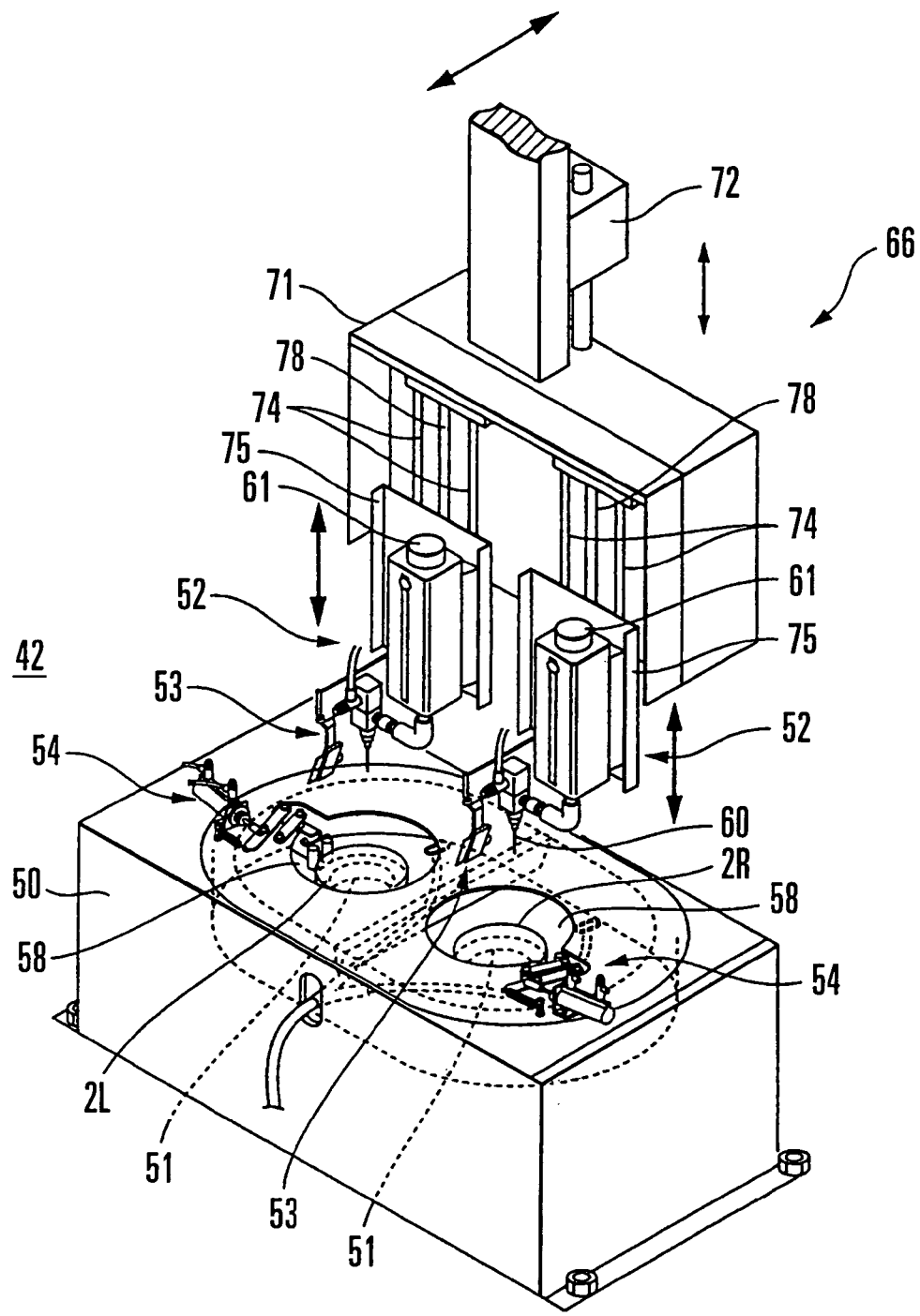
FIG. 3 is an appearance perspective view of a coating device.
Figure 4:
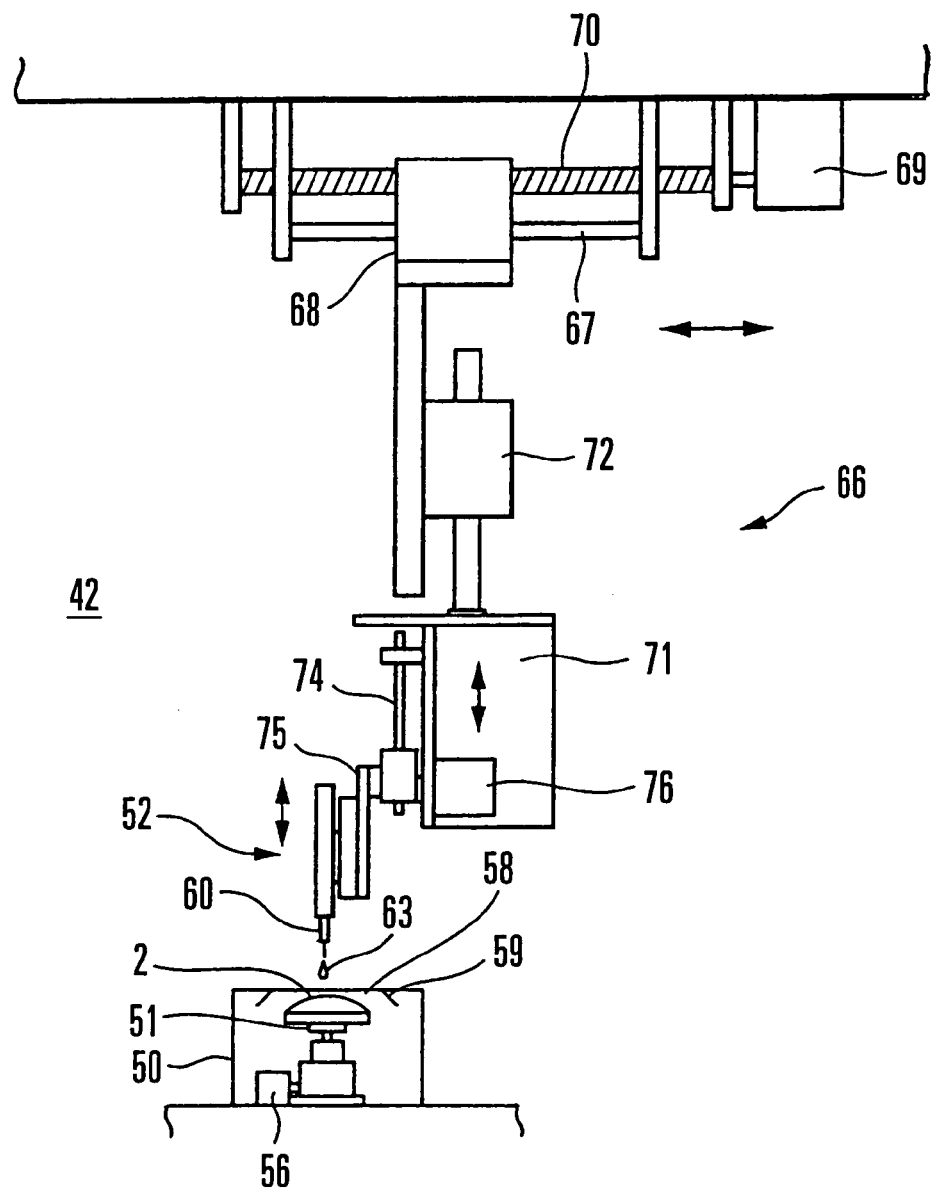
FIG. 4 is a schematic sectional side view of the coating device shown in FIG. 3.

Referring to FIGS. 3 and 4, the driving device 66 for the coating solution dripping means 52 comprises a first slide plate 68, a first motor 69 which moves the first slide plate 68 in the back-and-forth direction, a ball screw 70 which transmits the rotation of the first motor 69 to the first slide plate 68, and the like. The first slide plate 68 is attached to a pair of left and right guide bars 67 arranged on the ceiling surface of the clean room 7 to be movable in the back-and-forth direction. A second slide plate 71 which is vertically moved by a vertical cylinder 72 is disposed under the first slide plate 68. The vertical cylinder 72 is fixed to the first slide plate 68. A pair of left and right third slide plates 75 and a pair of left and right second motors 76 which vertically move the third slide plates 75 independently of each other are attached to the second slide plate 71. The third slide plates 75 are held by a pair of left and right guide bars 74 attached to the front surface of the second slide plate 71 to be vertically movable. The rotation of the second motors 76 is transmitted to the third slide plates 75 through ball screws 78. The coating solution dripping means 52 are attached to the front surfaces of the respective third slide plates 75.

When the coating solution dripping means 52 drip the coating solution 63 onto the spectacle lens 2, the driving device 66 drives and controls the coating solution dripping means 52 such that the nozzle 60 moves spirally from the periphery of the spectacle lens 2 inwardly. When the coating solution 63 is dripped onto the coating target surface 2a of the coating target surface 2a, it spreads onto the entire surface of the coating target surface 2a with the centrifugal force generated by the rotation of the rotary table 51, and partly scatters to fall in the coating container 50.

In this manner, when the coating device 42 applies the coating solution 63 to the coating target surface 2a of each of the spectacle lenses 2L and 2R by spin coating, the film thickness of the coating solution 63 increases on the peripheral portion of the coating target surface 2a to form a swell. If the film thickness of the coating solution 63 on the peripheral portion of the coating target surface 2a is large, when the coating solution 63 is cured in the next curing step by ultraviolet radiation, wrinkles may be formed in the coating film.

In view of this, according to the present invention, the spatula mechanisms 53 are attached to the third slide plates 75 so as to be located in the vicinities of the respective coating solution dripping means 52. The spatula mechanisms 53 remove the excessive coating solution 63 on the peripheral portions of the coating target surfaces 2a of the respective spectacle lenses 2L and 2R so as to uniform the film thicknesses.

Figure 5:
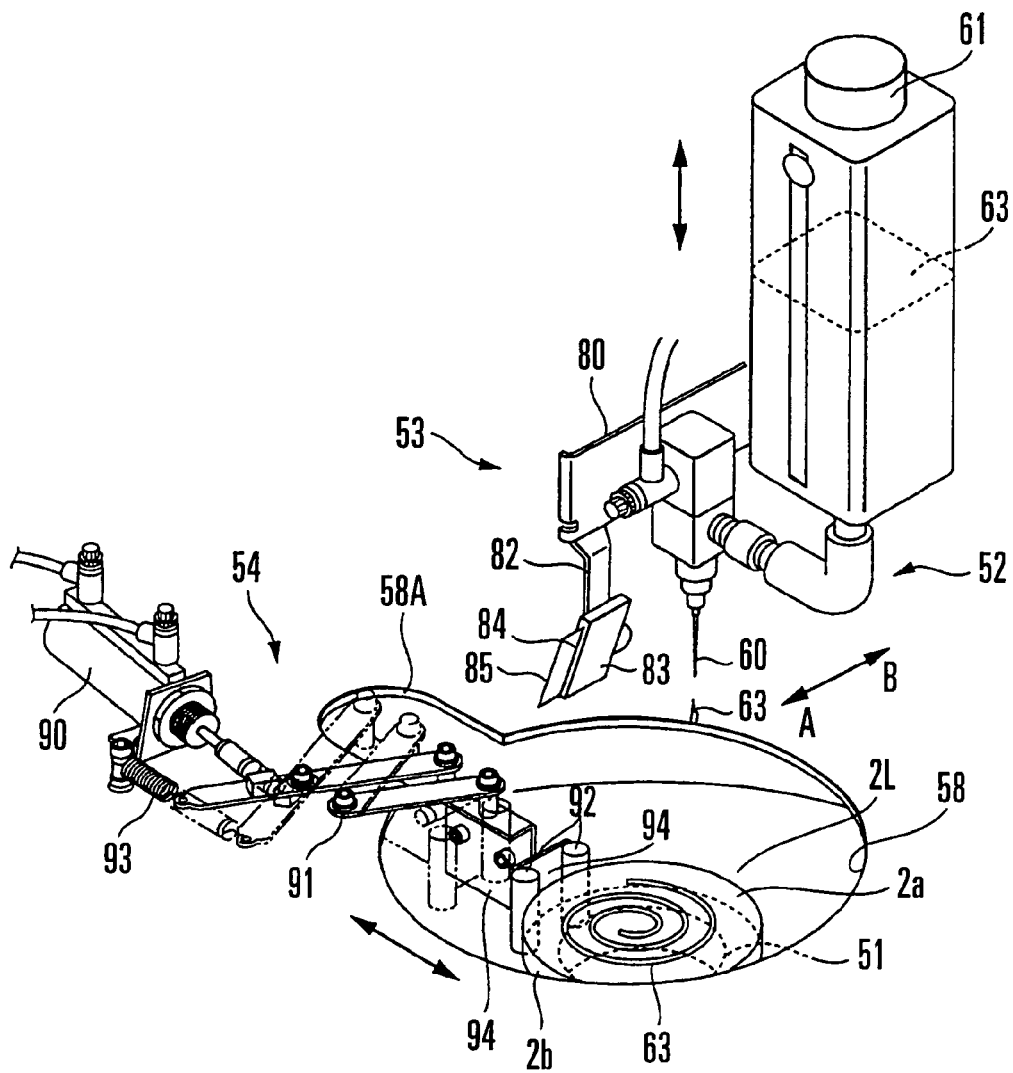
FIG. 5 is a perspective view showing the outer appearance of a coating solution spatula mechanism and a lens outer surface solution smoothening mechanism.

Referring to FIG. 5, each spatula mechanism 53 comprises a support arm 80 attached to the third slide plate 75, an attaching plate 82 attached to the distal end of the support arm 80 so as to be located on the left side of the nozzle 60, a holder 83 attached to the lower end of the attaching plate 82, and a spatula plate 85 detachably inserted and fixed in a slit 84 formed in front end face of the holder 83. The holder 83 is attached to the support arm 82 to be inclined toward the spectacle lens 2 at a necessary angle, e.g., 45°, with respect to the vertical line. Thus, the spatula plate 85 is also inclined in the same direction at the same angle as the holder 83. The spatula plate 85 is also inclined at a necessary angle, e.g., 30°, so that its rear end side is farther away from the spectacle lens 2 than its front end with respect to the back-and-forth direction of the coating solution dripping means 52, i.e., directions of arrows A and B in FIG. 5. That is, the spatula plate 85 is inclinedly attached to the holder 83 to intersect the vertical line and the horizontal line in the back-and-forth direction.

When the spatula mechanism 53 is in a non-use state wherein the coating solution is not dripped, it stands by behind the spectacle lens 2L. When the coating solution is dripped, the spatula mechanism 53 is moved to the left side of the spectacle lens 2L by the forward movement of the first slide plate 68. When the front end edge of the spatula plate 85 is brought into contact with the peripheral portion of the coating target surface 2a, the excessive coating solution 63 staying in the entire peripheral portion of the coating target surface 2a is scraped off by the spatula plate 85. At this time, the rotational direction of the spectacle lens 2 is clockwise in FIG. 5. In FIG. 5, the spatula mechanism 53 for the left-eye spectacle lens 2R has been described. The spatula mechanism 53 for the right-eye spectacle lens 2L also has completely the same structure, and a description thereof will be omitted.

When the coating solution 63 is applied to the coating target surfaces 2a of the spectacle lenses 2L and 2R by the coating device 42 with spin coating, the coating solution 63 droops from the peripheral portions of the coating target surfaces 2a along outer surfaces 2b and swells like streaks. Hence, according to the present invention, the lens outer surface solution smoothening mechanisms 54 are provided to correspond to the respective spectacle lenses 2L and 2R. The coating solution 63 attaching to the outer surfaces 2b is spread over the entire outer surfaces 2b so the film thicknesses of the coating solution 63 become uniform.

Each solution smoothening mechanism 54 comprises a holding mechanism 91 actuated by a driving device 90, and a pair of coating solution removing members 92. The holding mechanism 91 comprises a stretchable pantograph mechanism and is usually held in a folded state by a tensile coil spring 93. In actuation, when the holding mechanism 91 is driven by the driving device 90 to stretch against the tensile coil spring 93, it urges the pair of coating solution removing members 92 against the outer surface 2b of the spectacle lens 2L with a predetermined pressure. As the driving device 90, an air cylinder is employed.

The coating solution removing members 92 are formed of a highly adsorptive foamed resin, preferably sponge, into cylindrical shapes and vertically attached to the surface of an attaching plate 94, attached to the front end of the pantograph mechanism 91, at a predetermined gap from each other in the back-and-forth direction. When the coating solution removing members 92 are urged against the outer surface 2b of the rotating spectacle lens 2L, they spread the coating solution 63 attaching to the outer surface 2b thinly over the entire outer surface to have a uniform film thickness. The spatula mechanisms 53 and solution smoothening mechanisms 54 are configured to actuate substantially simultaneously after the coating solution 63 is dripped by the coating solution dripping means 52.

Figure 6:
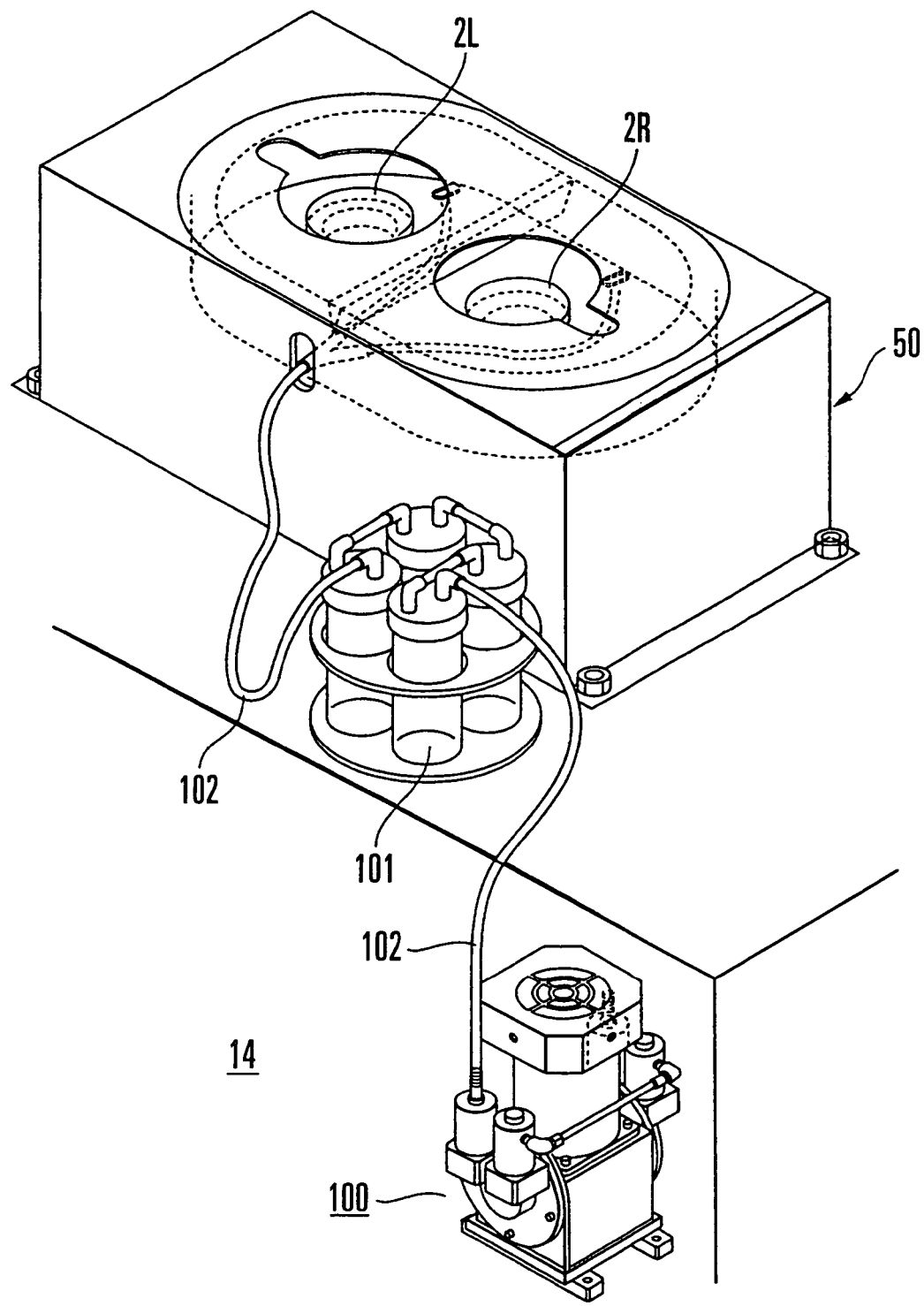
FIG. 6 is a perspective view showing the outer appearance of a coating solution collecting device.

When the excessive coating solution 63 which is scattered from the coating target surface 2a of the spectacle lens 2 with the centrifugal force or removed by the spatula mechanism 53 or lens outer surface solution smoothening mechanism 54 falls into the coating container 50, it is collected by the coating solution collection device 14 and reused. The coating solution collection device 14 comprises a suction pump 100 and a plurality of collecting containers 101 which collect the coating solution 63, as shown in FIG. 6. The suction pump 100 is stored in the lower chamber 6 of the box 3 shown in FIG. 1. The plurality of collecting containers 101 are connected in series to each other through a pipe 102. One end of the pipe 102 is connected to the suction pump 100. The other end of the pipe 102 is branched in a Y shape, and the two branch portions are inserted in the coating container 50 and positioned immediately under the respective spatula mechanisms 53.

Referring to FIGS. 1 and 2 again, a third convey means 110 which reciprocates among the second transfer position $T_2$ and third and fourth transfer positions $T_3$ and $T_4$ is provided above the coating portion 22. The third transfer position $T_3$ is where the coating device 42 is arranged. The fourth transfer position $T_4$ is behind the third transfer position $T_3$ and where an empty lens rack 120 stands by.

As shown in FIG. 1, the third convey means 110 comprises a slider 112 which is arranged on a horizontal rail 111 arranged on the left inner wall of the clean room 7 to be movable in the back-and-forth direction, a motor (not shown) which reciprocally moves the slider 112, a horizontal attaching plate 113 which extends rightward and is arranged on the slider 112 to be vertically movable, a driving device (not shown) which vertically moves the attaching plate 113, a pair of left and right clamp means 114A and 114B which are attached to the lower surface of the attaching plate 113, and the like. The third convey means 110 is drive-controlled in the following manner. When the spectacle lenses 2L and 2R placed on the first stages 41 are clamped by the pair of clamp means 114A and 114B, the third convey means 110 conveys them to above the coating device 42 and transfers them to the respective rotary tables 51 in the coating container 50. When the coating device 42 finishes the operation of applying the coating solution 63 to the spectacle lenses 2L and 2R, the third convey means 110 clamps the spectacle lenses 2L and 2R on the respective rotary tables 51 again, conveys them to the fourth transfer position $T_4$, and stores them in the empty lens rack 120 which stands by at the fourth transfer position $T_4$.

Each of the clamp means 114A and 114B has four openable/closeable clamp pins 116 which clamp the outer surface 2b of the corresponding one of the spectacle lenses 2L and 2R, and a driving device (not shown) such as a motor which opens and closes the clamp pins 116, and reciprocates between the second and fourth transfer positions $T_2$ and $T_4$. The four clamp pins 116 comprise two, left and right pins in front and two, left and right pins at the back. The two, front and rear clamp pins that oppose each other approach and separate from each other.

The pair of clamp means 114A and 114B usually stand by above the second transfer position $T_2$. When the spectacle lenses 2L and 2R are placed on the respective first stages 41, the clamp means 114A and 114B move downward to hold the spectacle lenses 2L and 2R, move upward again to convey them to the third transfer position $T_3$, and transfer them onto the respective rotary tables 51 in the coating container 50. When the coating device 42 finishes applying the coating solution 63 to the spectacle lenses 2, the pair of clamp means 114A and 114B hold the spectacle lenses 2L and 2R, coated with the coating solution 63, on the respective rotary tables 51 again, extract them from the coating container 50, and convey them to the fourth transfer position $T_4$. The distance between the pair of clamp means 114A and 114B is set equal to the distance $d_1$ between the first stages 41. The upper surface openings 58 of that storing portion of the coating container 50 which stores the spectacle lenses 2L and 2R form circles larger than circles circumscribed by the clamp pins 116 in the maximal open state, so the third convey means 110 can store and extract the spectacle lenses 2 readily. Each opening 58 has a U-shaped groove 58A, as shown in FIG. 5, through which the holding mechanism 91 of the corresponding lens outer surface solution smoothening mechanism 54 can move forward/backward.

Figure 7:
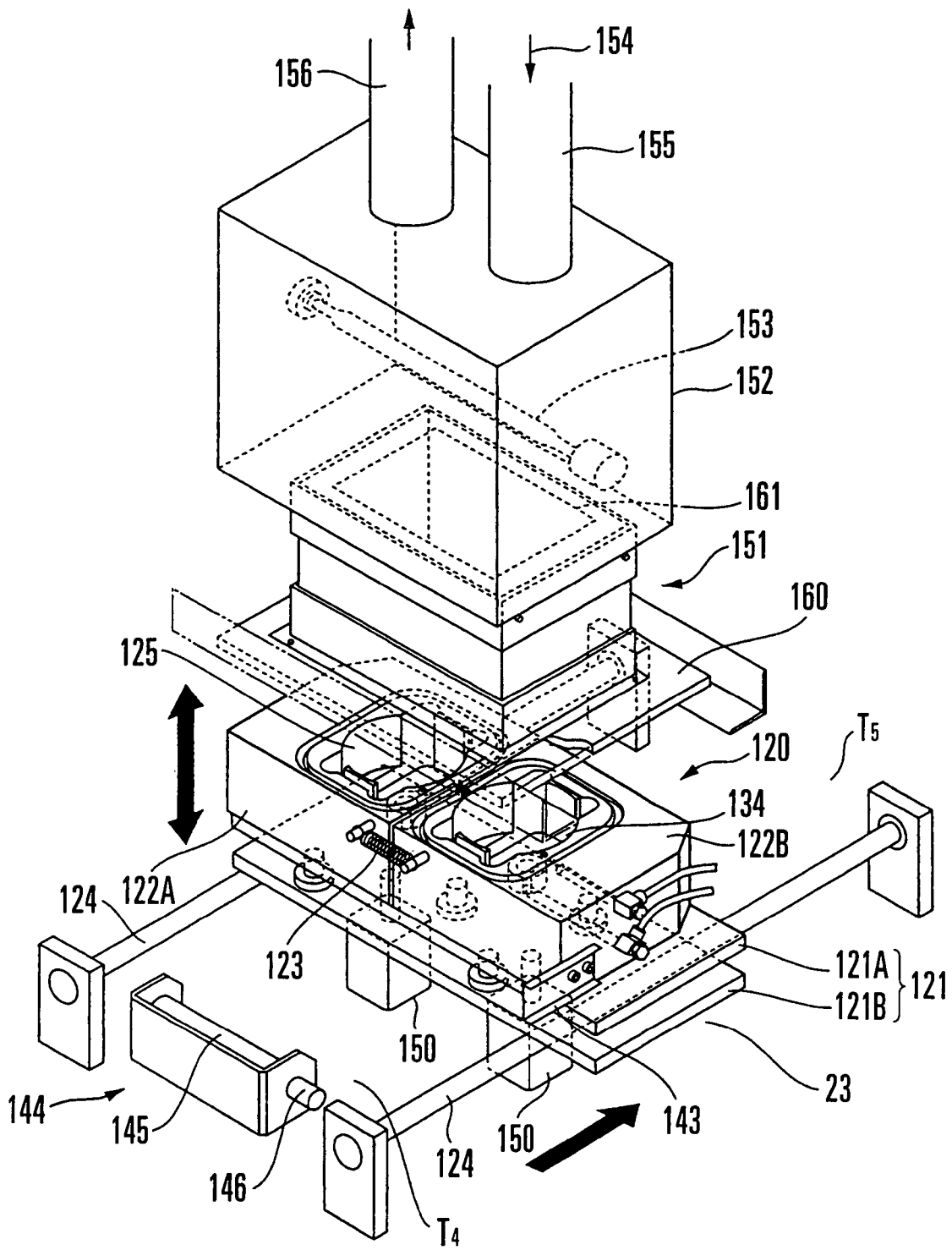
FIG. 7 is a perspective view showing the outer appearance in a state wherein a lens rack is moved to a curing portion.
Figure 8:
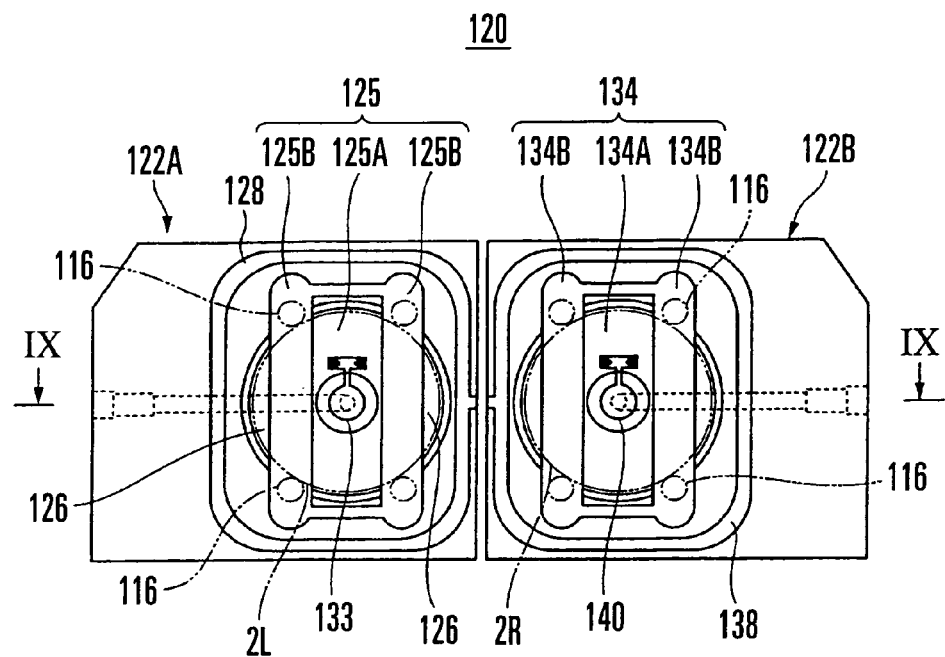
FIG. 8 is a plan view of the lens rack.
Figure 9:
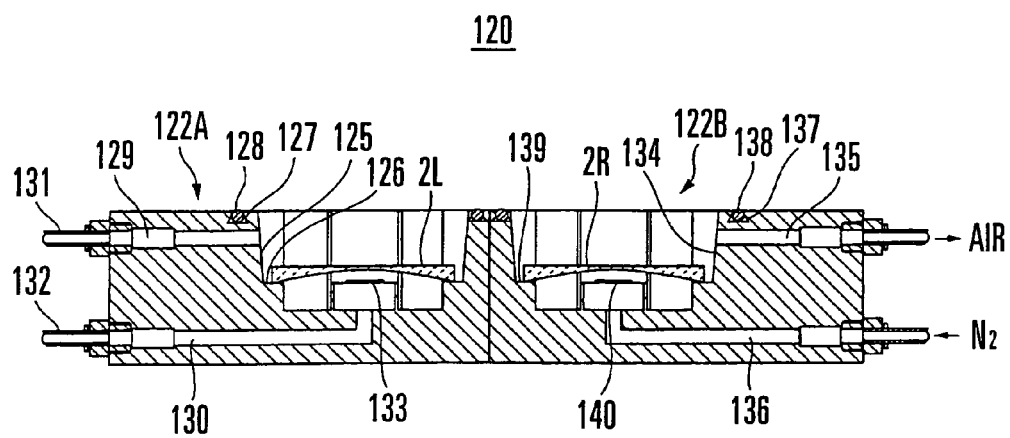
FIG. 9 is a sectional view taken along the line IX-IX of FIG. 8.

Referring to FIGS. 7 to 9, the lens rack 120 has two cases which are disposed on the base plate 121 and respectively store the spectacle lenses 2L and 2R, that is, a stationary case 122A which stores the left-eye spectacle lens 2L, and a movable case 122B which stores the right-eye spectacle lens 2R.

The base plate 121 comprises an upper plate 121A and lower plate 121B. The upper plate 121A is set on the lower plate 121B to be vertically movable. The lower plate 121B is slidably supported by a pair of left and right guide bars 124 which extend parallel to each other in the back-and-forth direction, and reciprocally moved among the fourth transfer position $T_4$, the curing portion 23, and a fifth transfer position $T_5$ by a fourth convey means 147 shown in FIG. 2. As the fourth convey means 147, for example, a belt driven by a motor is employed.

The stationary case 122A is fixed to the left end of the upper surface of the upper plate 121A and has a storing portion 125 which opens upward to store the spectacle lens 2L. The storing portion 125 comprises a hole 125A which stores the spectacle lens 2L, and four pin grooves 125B, which are long in the back-and-forth direction and each of which has one end communicating with the hole 125A. The hole 125A is tapered such that its diameter increases upward. This facilitates irradiation of the peripheral portion of the spectacle lens 2L with the ultraviolet rays when curing the coating solution 63 by the light beam radiating device 151 (to be described later). When the spectacle lens 2L is to be stored in the storing portion 125 by the clamp means 114A of the third convey means 110, the four clamp pins 116 are inserted in the pin grooves 125B. Accordingly, the pin grooves 125B comprise two pin grooves 125B on the front side and two pin grooves 125B on the rear side of the hole 125A to oppose each other. The pin grooves 125B also enable a fifth convey means 171 (to be described later) to extract the spectacle lens 2L. A pair of left and right lens placing portions 126 integrally project from the inner wall of the storing portion 125 to support the two, left and right ends of the peripheral portion of the spectacle lens 2L.

Furthermore, the stationary case 122A is provided with an O-ring 128, air exhaust channel 129, and inert gas supply channel 130 to evacuate air in the storing portion 125 and purge it with an inert gas when the coating solution 63 is to be cured. As the inert gas, nitrogen gas is employed.

The O-ring 128 is fitted in an annular groove 127 formed in the upper surface of the stationary case 122A to surround the storing portion 125.

The air exhaust channel 129 is formed in the thick-walled portion of the stationary case 122A, and has one end that opens to the inner wall of the storing portion 125 and the other end connected to a vacuum pump (not shown) through a pipe 131. Similarly, the inert gas supply channel 130 is formed in the thick-walled portion of the stationary case 122A, and has one end that opens to the center of the bottom surface of the storing portion 125 and the other end connected to the nitrogen gas supply device 12 shown in FIG. 1 through a pipe 132. Therefore, nitrogen gas is supplied as the inert gas from the nitrogen gas supply device 12 to the storing portion 125. A baffle 133 which prevents floating of the spectacle lens 2L with the nitrogen gas is arranged, immediately under the spectacle lens 2L, at the center in the storing portion 125.

The movable case 122B is arranged on the right side of the stationary case 122A to be movable to approach and separate from the stationary case 122A, and is biased toward the stationary case 122A by a tensile coil spring 123. The movable case 122B is axi-symmetric with the stationary case 122A and has completely the same inner structure as that of the stationary case 122A, although its outer shape is slightly different from that of the stationary case 122A. Hence, the movable case 122B has a storing portion 134 which opens upward and stores the spectacle lens 2R, an air exhaust channel 135 and inert gas supply channel 136, and an annular groove 137 which surrounds the storing portion 134. An O-ring 138 is fitted in the annular groove 137. That is, the present invention serves to cure the coating solution 63 applied to the spectacle lenses 2L and 2R in a nitrogen gas atmosphere in the stationary case 122A and movable case 122B.

The storing portion 134 of the movable case 122B comprises a tapered hole 134A the diameter of which increases upward, and four pin grooves 134B each having one end which communicates with the hole 134A. A pair of left and right lens placing portions 139 and a baffle 140 are arranged in the storing portion 134. The four pin grooves 134B allow insertion of the four clamp pins 116 of the clamp means 114B of the third convey means 110.

When the lens rack 120 stands by at the fourth transfer position $T_4$, the stationary case 122A and movable case 122B are held to be spaced apart most such that the distance between the storing portions 125 and 134 is equal to the distance $d_1$ between the first lens stages 41.

The distance setting means 144 comprises an air cylinder 145 which horizontally extends on the apparatus stationary side of the fourth transfer position $T_4$, and usually presses a plate 143 provided to the movable case 122B with a rod 146 of the air cylinder 145 against the tensile coil spring 123, so the movable case 122B is spaced apart from the stationary case 122A. The air cylinder 145 is switched from ON to OFF immediately before the lens rack 120 moves from the fourth transfer position $T_4$ toward the curing portion 23, so as to release the plate 143 that has been pressed by the rod 146. When the movable case 122B pressed by the distance setting means 144 is released, the movable case 122B is moved leftward by the spring force of the tensile coil spring 123 to abut against the stationary case 122A, thus reducing the distance between the centers of the storing portions 125 and 134 of the two stationary cases 122A and 122B. The distance between the centers is equal to the distance $d_2$ between the spectacle lenses 2L and 2R in the tray 24.

A driving means 150 which vertically moves the lens rack 120 together with the upper plate 121A is disposed in the curing portion 23. The light beam radiating device 151 is disposed above the curing portion 23. The driving means 150 comprises a pair of left and right air cylinders which are set to face upward. When the lens rack 120 stops at the curing portion 23, the driving means 150 is driven to move the upper plate 121A upward to the height of the lower surface of the light beam radiating device 151.

The light beam radiating device 151 comprises an ultraviolet lamp 153 which is horizontally arranged in a hermetic housing 152. Cooling air 154 is supplied into the housing 152 to prevent the temperature of the ultraviolet lamp 153 from increasing when the coating solution 63 is to be cured. For this purpose, one end of a cooling air pipe 155 and one end of an exhaust pipe 156 are connected to the housing 152. The other end side of the exhaust pipe 156 is connected to a sirocco fan 157 shown in FIG. 1.

The opening in the bottom surface of the housing 152 is sealed by a transparent plate 160 which transmits ultraviolet rays emitted from the ultraviolet lamp 153. In curing the coating solution 63, when the stationary case 122A and movable case 122B of the lens rack 120 are pushed upward by the driving means 150, they are urged against the lower surface of the transparent plate 160 through the O-rings 128 and 138. In this state, the coating solution 63 is cured by the light beam radiating device 151. More specifically, when curing the coating solution 63, the light beam radiating device 151 seals the openings 125 and 134 of the stationary cases 122A and 122B by the transparent plate 160. The ultraviolet rays emitted from the ultraviolet lamp 153 are transmitted through the transparent plate 160 to irradiate the coating solution 63 applied to the spectacle lenses 2L and 2R in the stationary case 122A and movable case 122B, thus curing the coating solution 63. The operation of curing the coating solution 63 by the light beam radiating device 151 is performed after the stationary case 122A and movable case 122B are sealed by the transparent plate 160 and air in the storing portions 125 and 134 is purged with the nitrogen gas.

Furthermore, in the housing 152, a shutter 161 is arranged between the ultraviolet lamp 153 and transparent plate 160. The shutter 161 is usually held in a closed state to block the ultraviolet rays emitted from the ultraviolet lamp 153, and is opened when curing the coating solution 63.

When the treatment of curing the coating solution 63 by the light beam radiating device 151 is complete, the fourth convey means 147 conveys the lens rack 120 from the curing portion 23 to the fifth transfer position $T_5$. A sixth transfer position $T_6$ is arranged behind the fifth transfer position $T_5$. A pair of left and right second stages 170 are arranged at the sixth transfer position $T_6$. The second stages 170 have completely the same structures as those of the first stages 41. The fifth convey means 171 is arranged in a space above between the fifth and sixth transfer positions $T_5$ and $T_6$. The fifth convey means 171 extracts the spectacle lenses 2L and 2R from the lens rack 120 conveyed to and stopped at the fifth transfer position $T_5$, conveys them to the sixth transfer position $T_6$, and places them on the second stages 170, respectively. The fifth convey means 171 has substantially the same structure as that of the third convey means 110, and a description thereof will accordingly be omitted. The fifth convey means 171 is different from the third convey means 110 in the following respects. Namely, the fifth convey means 171 employs a cylinder as the driving device. The distance between a pair of clamp means 172A and 172B which clamp the spectacle lenses 2L and 2R is set equal to the distance $d_2$ between the spectacle lenses 2L and 2R in the tray 24.

When the spectacle lenses 2L and 2R placed on the second stages 170 are held by a sixth convey means 180, they are conveyed to a seventh transfer position $T_7$ and stored in the empty tray 24 which stands by at the seventh transfer position $T_7$. The seventh transfer position $T_7$ is just on the right side of the sixth transfer position $T_6$ and behind the first transfer position $T_1$. A tray stopper (not shown) which stops the empty tray 24 is arranged at the seventh transfer position $T_7$.

The sixth convey means 180 reciprocates between the sixth and seventh transfer positions $T_6$ and $T_7$ to convey the spectacle lenses 2L and 2R. The sixth convey means 180 has substantially the same structure as that of the second convey means 44, and a detailed description thereof will accordingly be omitted. When the spectacle lenses 2L and 2R are stored in the empty tray 24 that stands by at the seventh transfer position $T_7$, the first convey means 30 is driven to convey the tray 24 backward behind the clean room 7.

In this manner, since the coating apparatus 1 according to the present invention performs the coating treatment for the set of two spectacle lenses 2L and 2R simultaneously in the parallel manner, it can improve the productivity and is suitable particularly to the coating treatment for special-order spectacle lenses. More specifically, as in the coating apparatus described in Japanese Patent Laid-Open No. 2002-177852, in the conventional treatment method with which the spectacle lenses are sequentially coated one by one, when treating special-order spectacle lenses, coating treatment and curing treatment of the coating solution for two lenses of one wearer, and coating treatment and curing treatment of the coating solution for two lenses of two different wearers are performed alternately, requiring a complicated control system. In contrast to this, according to the present invention, spectacle lenses of the same type are always treated in units each formed of a set of two lenses. Thus, the control system can be simplified.

In the curing treatment of the coating solution 63 by the light beam radiating device 151, the lens rack 120 is urged against the transparent plate 160 from outside the light beam radiating device 151 through the O-rings 128 and 138, and the spectacle lenses 2L and 2R in the lens rack 120 are irradiated with ultraviolet rays through the transparent plate 160. As the spectacle lenses 2 need not be loaded in or unloaded from the light beam radiating device 151, they can be handled readily, so that the curing operation can be performed more quickly.

In the curing treatment of the coating solution 63, air in the lens rack 120 is purged with nitrogen gas. Thus, the coating solution 63 can be prevented from curing by reaction with oxygen, and dust or the like can be prevented from attaching to the coating solution 63, so that a high-quality coating film can be formed. Only the lens storing space of the lens rack 120 is filled with the nitrogen gas, so that the use amount of nitrogen gas can be decreased.

As the convey of the spectacle lenses 2L and 2R and the coating and curing steps of the coating solution 63 are completely automated, the burden to the operator can be decreased greatly.

The lens rack 120 which stores the set of two spectacle lenses 2 is linearly moved from the coating portion 22 to the curing portion 23. No special space need be reserved on the side of the lens rack 120, enabling downsizing the apparatus.

The coating solution 63 is cured with the stationary case 122A and movable case 122B being in contact with each other. The distance between the two spectacle lenses 2L and 2R can reduce, so the ultraviolet lamp 153 can be compact.

The embodiment described above exemplifies a case in which a photochromic coating film is to be formed on the spectacle lens 2. Note that the present invention is not limited to this embodiment, but can also be applied to a case wherein a coating film having light-shielding properties, anti-glaring properties, anti-scratch properties, and the like is to be formed.

Although each of the clamp means 114A and 114B of the third convey means 110 comprises the four clamp pins 116 in the embodiment described above, the clamp means is not limited to this arrangement, but can comprise three clamp pins. In this case, each of the storing portions 125 and 134 of the stationary case 122A and movable case 122B may comprise a round hole and three pin grooves.

INDUSTRIAL APPLICABILITY

The present invention is not limited to a spectacle lens but can also be applied to an optical lens such as a camera lens.

The invention claimed is:

1. A coating apparatus for an optical lens, comprising:
a coating device which applies a coating solution to a coating target surface of an optical lens;
a light beam radiating device which emits a light beam to the coating solution applied to the optical lens to cure the coating solution; and
a lens rack which stores a set of two optical lenses and conveys the stored optical lenses from a coating position to a curing position of the coating solution,
said coating device comprising two rotary tables where the set of two optical lenses are set each with the coating target surface thereof facing up, a driving device which rotates said rotary tables independently of each other, and two coating solution dripping means each for dripping the coating solution onto the coating target surface of the optical lens set on said rotary tables,
wherein said light beam radiating device emits the light beam to the optical lenses in said lens rack with said lens rack being hermetically closed;
characterized in that
said light beam radiating device comprises a light source stored in a housing and a transparent member which covers an opening of said housing on a irradiation direction side and transmits the light beam emitted from said light source therethrough, and said lens rack has a storing portion in and from which the optical lenses can be stored and extracted, said storing portion having such a shape as to be closed when said lens rack is brought into tight contact with said transparent member through a seal member.

2. A coating apparatus for an optical lens according to claim 1, characterized in that air in said lens rack is purged with an inert gas when the coating solution applied to the optical lenses is to be cured.

3. A coating apparatus for an optical lens, comprising:
a coating device which applies a coating solution to a coating target surface of an optical lens;
a light beam radiating device which emits a light beam to the coating solution applied to the optical lens to cure the coating solution; and
a lens rack which stores a set of two optical lenses and conveys the stored optical lenses from a coating position to a curing position of the coating solution,
said coating device comprising two rotary tables where the set of two optical lenses are set each with the coating target surface thereof facing up, a driving device which rotates said rotary tables independently of each other, and two coating solution dripping means each for dripping the coating solution onto the coating target surface of the optical lens set on said rotary tables,
wherein said light beam radiating device emits the light beam to the optical lenses in said lens rack with said lens rack being hermetically closed;
characterized in that
said lens rack has two cases at least one of which is disposed to be movable to come into contact with and separate from the other and which respectively store optical lenses, and biasing means for biasing said two cases to approach each other,
said two cases being held spaced apart from each other when optical lenses coated with a coating solution are to be stored therein, and being held in contact with each other when the coating solution applied to the optical lenses is to be cured.

4. A coating apparatus for an optical lens according to claim 3, characterized in that said coating device further comprises a spatula mechanism which removes the coating solution staying on a peripheral portion of the coating target surface of the optical lens.

5. A coating apparatus for an optical lens according to claim 3, characterized in that said coating device further comprises a lens outer surface solution smoothening mechanism which uniforms a film thickness of the coating solution attaching to an outer surface of the optical lens.

6. A coating apparatus for an optical lens according to claim 3, characterized in that said coating device further comprises a coating solution collection device which collects an extra coating solution that has scattered from the optical lens.

7. A coating apparatus for an optical lens, comprising:
a coating device which applies a coating solution to a coating target surface of an optical lens;
a light beam radiating device which emits a light beam to the coating solution applied to the optical lens to cure the coating solution; and
a lens rack which stores a set of two optical lenses and conveys the stored optical lenses from a coating position to a curing position of the coating solution,
said coating device comprising two rotary tables where the set of two optical lenses are set each with the coating target surface thereof facing up, a driving device which rotates said rotary tables independently of each other, and two coating solution dripping means each for dripping the coating solution onto the coating target surface of the optical lens set on said rotary tables,
wherein said light beam radiating device emits the light beam to the optical lenses in said lens rack with said lens rack being hermetically closed;
characterized in that said lens rack comprises an air exhaust channel through which internal air is exhausted and an inert gas supply channel through which an inert gas is supplied.

* * * * *